Oct. 12, 1954     E. C. COULOMBE, JR     2,691,692
COMBINED CABLE GUARD AND TRANSPORTING DEVICE
Filed April 2, 1952
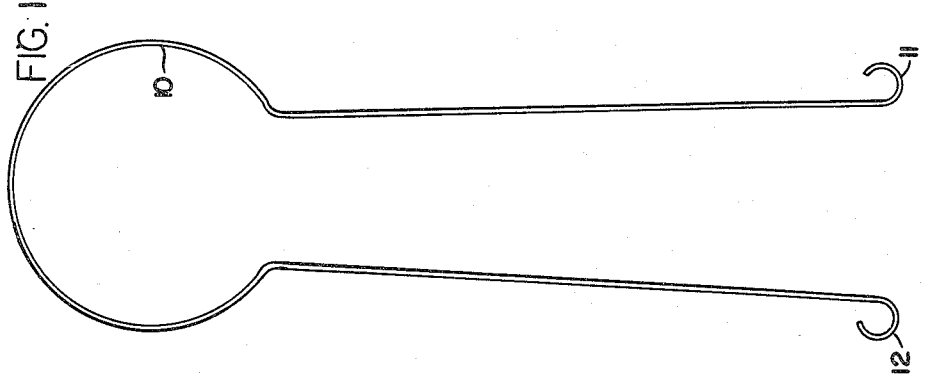
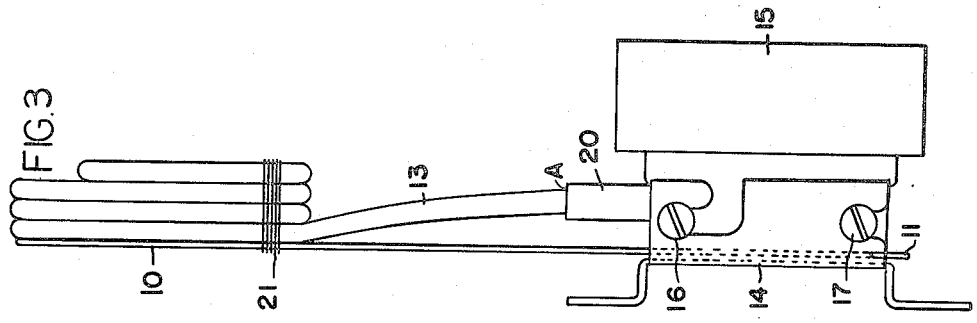
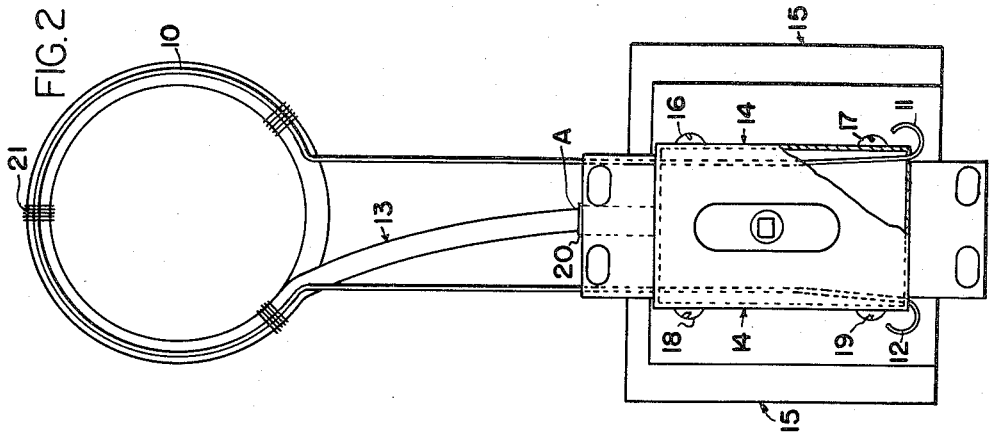
INVENTOR.
EDWIN C. COULOMBE JR
BY
ATTY.

Patented Oct. 12, 1954

2,691,692

UNITED STATES PATENT OFFICE 2,691,692

COMBINED CABLE GUARD AND TRANSPORTING DEVICE

Edwin C. Coulombe, Jr., Barrington, Ill., assignor to Automatic Electric Laboratories, Inc., Chicago, Ill., a corporation of Delaware Application April 2, 1952, Serial No. 280,096

1 Claim. (Cl. 174—50)

This invention relates in general to cable protecting devices and more particularly to such devices for protecting multiple conductor armour covered cables which are rigidly secured to the housings of cable terminal boxes and wherein the cables extend inside the housings and the cable conductors are connected to terminal blocks provided therein.

It has been found that when the armoured cables were secured to the terminal boxes and the conductor connections made therein, the subsequent packing, handling and transporting of the unit had to be accomplished with extreme care, otherwise the armoured exterior of the cable would become broken near the point that the cable was affixed to the housing of the terminal box, thereby resulting in injury to the conductors and exposing them to the elements. To partially overcome this fault, a special packing container was made for each unit and which resulted in an increased overall cost due to additional time, labor and material required for each unit.

It is, therefore, a principal object of the present invention to provide an improved cable protecting device that is extremely economical and simple to manufacture, yet which is efficient and reliable in overcoming the aforementioned difficulties.

Another object of the invention is to provide a device that will afford means for safely and efficiently transporting the assembled cables and terminal boxes.

The objects of the invention are accomplished in the following manner: A length of heavy wire, iron rod or the like, is bent into a U shape and the extreme ends of the U are bent outward into a semi-circle forming a hook or a slightly opened eye. The two arms of the U are then inserted behind and downward (over the end of the terminal box having the cable extending therefrom) and within the walls of the terminal box mounting bracket until the ends protrude beyond the lower edges of the bracket. A slight withdrawal of the U, or guard, will cause the lower edge of the bracket to engage within the hooks, or eyes, of the guard. The extending length of the cable is then coiled in a circle following the contour of the closed end, or bottom, of the U and secured to the U by means of cord, a soft wire, adhesive tape or the like. The device thus serves as a guard against the breakage of the armour of the cable at its point of entrance into the terminal box and also serves as a convenient carrying handle for the complete unit.

It will be appreciated that while the foregoing description and the illustration as disclosed in the drawings represent but one practical application of the invention, the guard specifically need not be formed of metal wire or rod, but could be of any suitable shape and comparable material. Additionally, the guard need not be restricted for use with cable terminal boxes such as used only in the field, or art, of telephony.

The objects and advantages of the invention will become apparent from the following detailed description when taken in connection with the accompanying drawing which form a part hereof.

In the drawings:

Fig. 1 represents a plan view of the cable guard.

Fig. 2 represents the guard, as disclosed in Fig. 1, mounted on a cable terminal box of the type such as used in the art of telephony and showing a part of the mounting bracket cut away to show how the hooks of the guard engage the mounting bracket.

Fig. 3 represents a side view of Fig. 2 taken from the right.

Referring in particular to Fig. 1, it will be seen that the guard 10 is shown to be such as heavy wire or iron rod and is formed into a U shape, with the two extreme ends being bent into hooks 11 and 12 respectively.

Referring in particular to Figs. 2 and 3, it will be seen that the cable terminal box 15 has a mounting bracket 14 attached thereto by means of screws 16—19 respectively. Projecting from the top of the terminal box 15 is the armoured cable 13. The armour of cable 13 usually is comprised of a metal that has a certain amount of elasticity, thus affording the cable a certain degree of flexibility. A coupling or cable connector 20 is secured to the terminal box 15 over an opening, or hole, in the box 15 and the cable 13 is inserted into the coupling 20 so that the conductors of the cable may be attached to the terminal block (not shown) within the terminal box. The armour covering of cable 13 is then leaded, or soldered, to the coupling 20 to form a rigid and air tight seal. It is, therefore, in the vicinity of point A that there is the strain and stress on the armour of cable 13 when the unit is packed, handled and transported. To prevent this strain on the armour 13, the ends of guard 10 such as shown in Fig. 1 are inserted within the two walls of the mounting bracket 14, in the manner such as shown in Fig. 2, so that the hooks 11 and 12 engage the lower edges of the mounting bracket 14. The remaining length of cable 13 is coiled following the contour of the upper part of the guard 10 as shown in the top portions of Figs. 2 and 3. The coiled part of cable 13 is then normally secured to the guard 10 by means of cord, adhesive tape, wire or the like as indicated at 21. The guard 10 now prevents excessive bending of the cable 13 and therefore prevents any strain in the vicinity of point A during packing, handling and transporting. The guard 10 also serves as a convenient handle for carrying the entire unit, both before the unit is packed and after it is unpacked.

Having thus described my invention, what is considered new and desired to have protected by the Letters Patent is pointed out in the appended claim.

What is claimed is:

The combination with a cable terminal box having an armour covered cable projecting therefrom and rolled into a circular coil prior to transportation of said box and having said cable armour permanently affixed to said box at the emerging point of said cable, of a combined cable guard and carrying handle comprising a rod formed into a U-shape having a substantially circular section formed at the base of said U conforming to the shape of said cable coil, a mounting bracket including retaining walls and having said terminal box detachably secured thereto for mounting said terminal box at a desired location, hook means at the ends of said U-shaped rod engaging the lower sides of said mounting bracket retaining walls, when the sides of said U are placed over and parallel to said emerging cable and said ends are inserted within said retaining walls, for detachably securing said guard to said box in a semi-rigid position with said circular section lying adjacent to and concentric with said cable coil, and means securing said cable coil to said circular section, whereby excessive movement of said cable with respect to said box is prevented to thereby protect said armour against breakage at said emerging point, and said guard and cable coil provide the said carrying handle for the complete assembly during transportation thereof.

References Cited in the file of this patent

UNITED STATES PATENTS

| Number | Name | Date |
| --- | --- | --- |
| 1,671,280 | Griffith | May 29, 1928 |
| 2,042,620 | Noyes | June 2, 1936 |
| 2,562,268 | Gratzner | July 31, 1951 |

FOREIGN PATENTS

| Number | Country | Date |
| --- | --- | --- |
| 271,753 | Switzerland | Feb. 16, 1951 |